US009884371B2

(12) United States Patent
Holleman et al.

(10) Patent No.: US 9,884,371 B2
(45) Date of Patent: Feb. 6, 2018

(54) MULTI-STEP DRILLING APPARATUS AND METHODS UTILIZING AIR FLOW SENSING CONTROL

(71) Applicant: THE BOEING COMPANY, Chicago, IL (US)

(72) Inventors: Wesley Edward Holleman, Long Beach, CA (US); Gary A. Lipczynski, Huntington Beach, CA (US); Nicholas R. Farrell, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 93 days.

(21) Appl. No.: 14/942,812

(22) Filed: Nov. 16, 2015

(65) Prior Publication Data

US 2017/0136554 A1    May 18, 2017

(51) Int. Cl.
*B23Q 11/00* (2006.01)
*B23Q 15/22* (2006.01)
(Continued)

(52) U.S. Cl.
CPC .............. *B23B 45/00* (2013.01); *B23B 49/02* (2013.01); *B23B 2215/04* (2013.01);
(Continued)

(58) Field of Classification Search
CPC .. B23Q 11/0046; B23Q 11/006; B23Q 15/22; B23Q 17/20; B23Q 17/22;
(Continued)

(56) References Cited

U.S. PATENT DOCUMENTS 2,294,303 A * 8/1942 Jagow .................... B23B 49/02
                                                    408/112
5,199,830 A * 4/1993 Otani .................... B23Q 3/002
                                                    408/67
(Continued)

FOREIGN PATENT DOCUMENTS

GB      2 506 508 A     4/2014
JP      63016910 A  *  1/1988   .......... B23Q 11/006
(Continued)

OTHER PUBLICATIONS

Machined translation, Japan patent document, JP 2002-144188A, "Working Machine for Printed Circuit Board" , Ito et al., May 2002.*

(Continued)

*Primary Examiner* — Daniel Howell
*Assistant Examiner* — Chwen-Wei Su
(74) *Attorney, Agent, or Firm* — Francisco A. Rubio-Campos; Apogee Law Group P.C.

(57) ABSTRACT

Apparatus and methods for performing and controlling the sequence of steps in a multi-step machining process utilizing a plurality of drilling units, where each drilling unit is configured to perform at least one step of the multi-step machining process. Air pressure sensors in each drilling unit measure air pressures at the surface of a workpiece where the cutting tool of the drilling unit is engaged, which measured air pressures indicate air flow at the surface. These air flows in turn indicate the state of the machining at the surface of the workpiece, and based on the state of the machining, a machine control system will determine whether a drilling unit can perform its particular machining operation in the proper sequence on the workpiece.

19 Claims, 6 Drawing Sheets

(51) Int. Cl.
*B23B 45/00* (2006.01)
*B23B 49/02* (2006.01)
*B23Q 17/20* (2006.01)

(52) U.S. Cl.
CPC ....... *B23B 2228/36* (2013.01); *B23B 2270/30* (2013.01); *B23B 2270/48* (2013.01); *B23B 2270/62* (2013.01); *B23Q 11/0046* (2013.01); *B23Q 15/22* (2013.01); *B23Q 17/20* (2013.01); *Y10T 408/56245* (2015.01)

(58) Field of Classification Search
CPC ............ B23B 2215/04; B23B 2228/36; B23B 2270/48; B23B 2270/62; Y10T 408/03; Y10T 408/50; Y10T 408/5623; Y10T 408/56245
See application file for complete search history.

(56) References Cited

U.S. PATENT DOCUMENTS

| | | | |
|---|---|---|---|
| 8,002,503 B2* | 8/2011 | Gamboa | B23Q 11/0046 408/1 R |
| 2006/0269369 A1 | 11/2006 | Fritsche et al. | |
| 2009/0035078 A1* | 2/2009 | Mejerwall | B23B 49/023 408/87 |
| 2010/0028096 A1 | 2/2010 | McCracken | |
| 2010/0050746 A1* | 3/2010 | Koshy | G01N 15/088 73/38 |

FOREIGN PATENT DOCUMENTS

| | | | | |
|---|---|---|---|---|
| JP | 2002144188 A | * | 5/2002 | |
| JP | 2012 223882 A | | 11/2012 | |
| WO | WO 2004052590 A1 | * | 6/2004 | ........... B23B 47/287 |

OTHER PUBLICATIONS

Machined translation, Japan patent document, JP 63-016910A, "Discharge Device for Chips and Harmful Gas From Boring Tool", Tsuda, T., Jan. 1988.*

European Patent Office Extended European Search Report, Application No. 16184740.5-1709, dated Apr. 20, 2017.

* cited by examiner

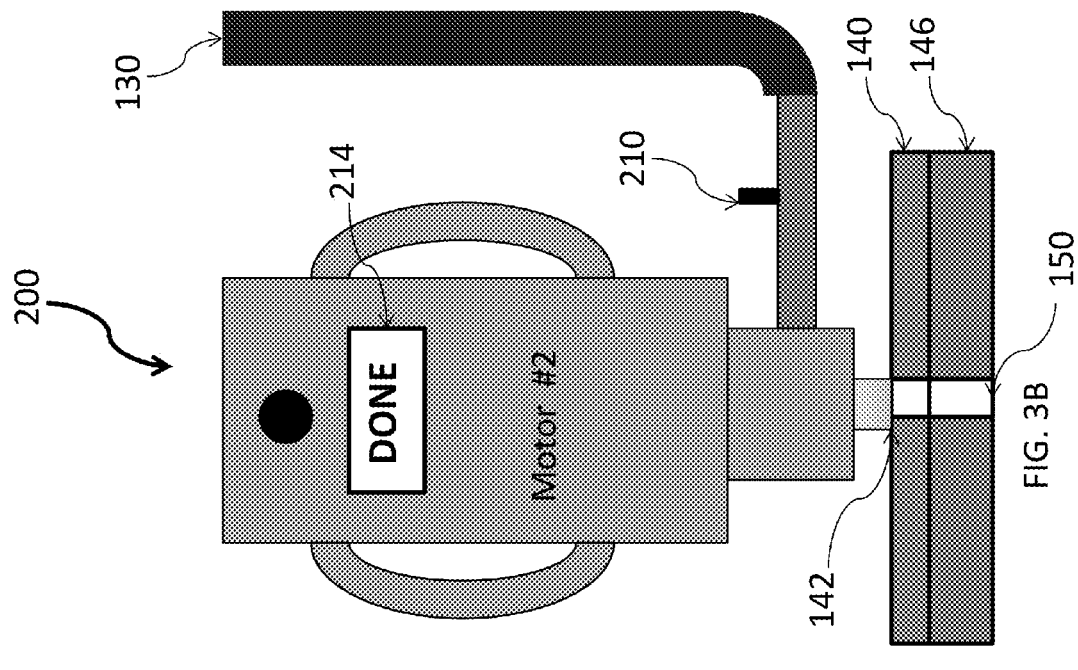
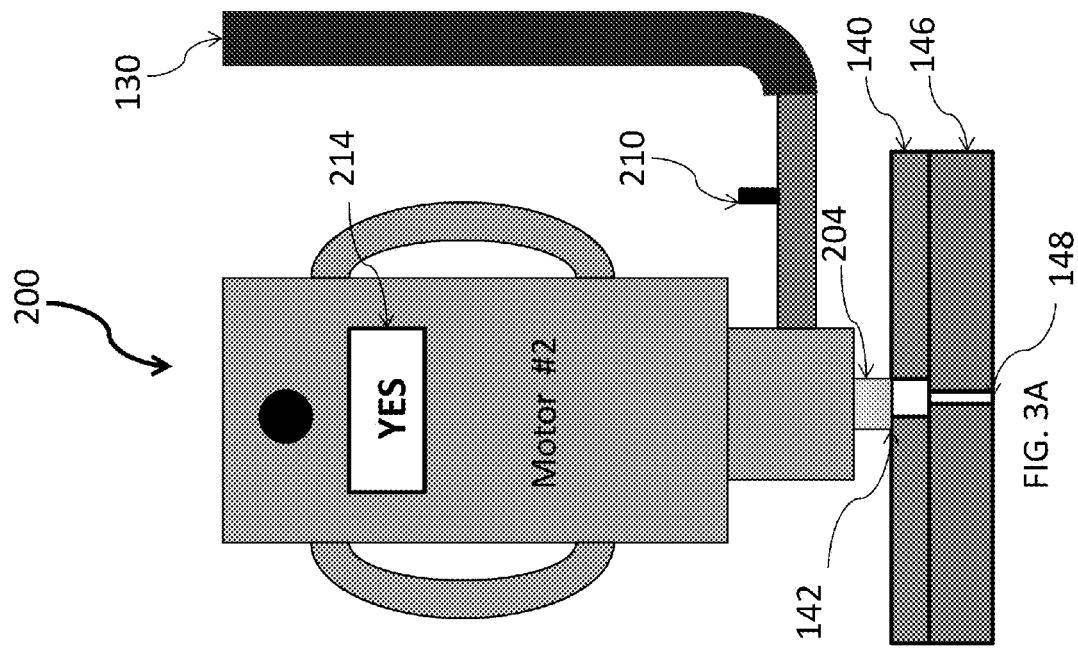

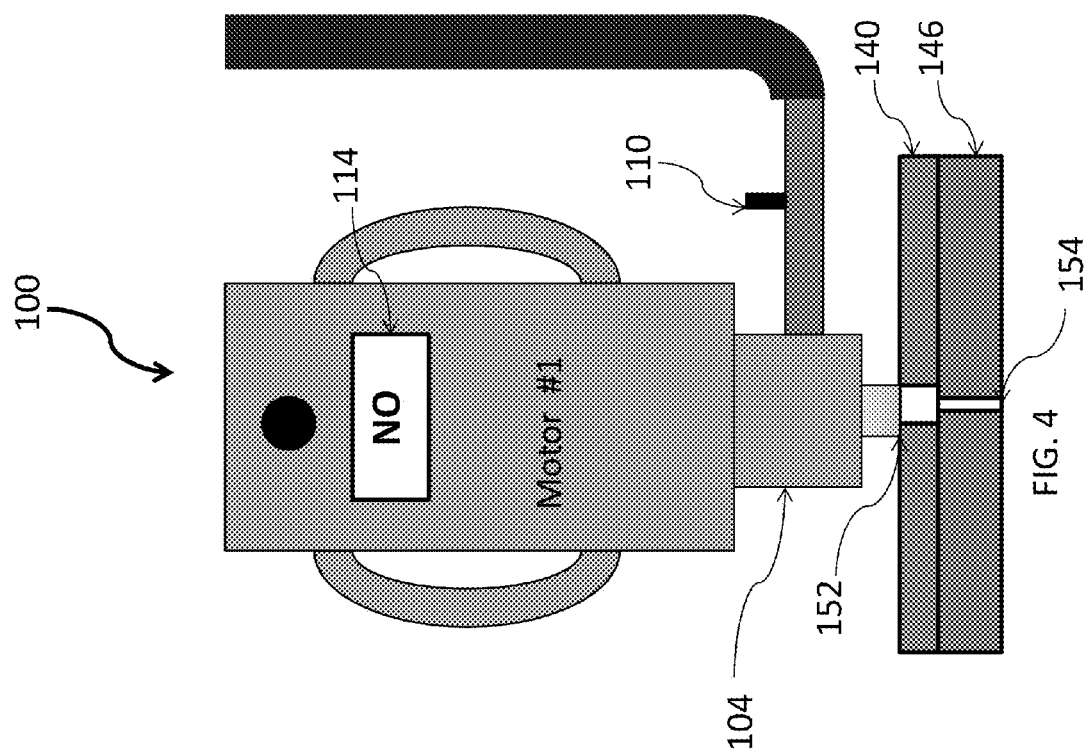

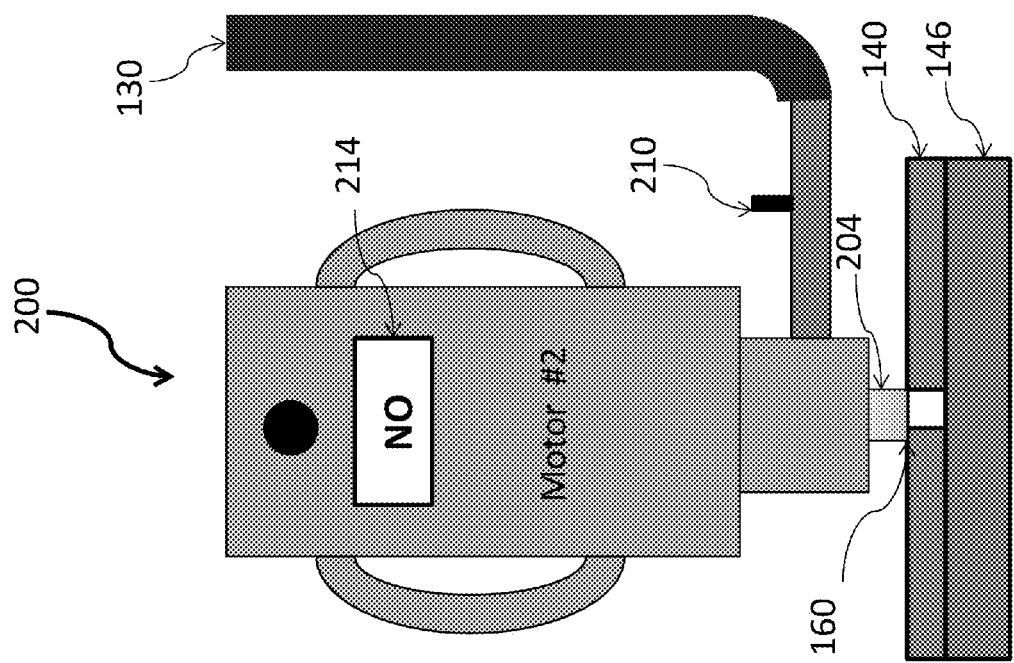

MULTI-STEP DRILLING APPARATUS AND METHODS UTILIZING AIR FLOW SENSING CONTROL

BACKGROUND OF THE INVENTION

1. Field of the Invention

The present disclosure is generally related to machine tooling apparatus and methods and more particularly, to multi-step drilling apparatus and methods using air flow sensing for controlling the sequence of steps in a multi-step drilling process.

2. Related Art

In the manufacturing of aircraft, the aerospace industry requires the drilling of thousands of fastener holes, used, for example, in attaching an aircraft skin to an airframe or a wing to an aircraft body. Typically, at present this drilling may be accomplished through the use of automated, semi-automated, or manual drill motors depending on the specific requirements of the parts being drilled.

A multi-step machining operation is particularly useful when machining composite/metal stack materials, which are generally workpieces consisting of multiple layers of carbon fiber-reinforced plastic (CFRP) and aluminum or hard metals (titanium, steel, etc.). Multi-layered components may also be preassembled in positioning jigs or fixtures with fastener holes being drilled through the assembly in a single pass, thus improving the accuracy of the positioning of the holes of the layers in the assembly.

In general, multiple steps are required in critical areas where the hole quality specifications (total cylindricity, surface roughness and carbon fiber delimitation) cannot be met with a single step process. A single step process is always desired but often it is physically impossible to generate a hole of the desired diameter and quality with a single pass. Mixed material stacks are generally the most difficult to drill but often holes in single material stacks must be drilled with multiple steps to achieve the desired hole quality.

In practice, each step in a sequence will result in a larger hole than the previous step until the desired final hole size is reached. This can mean that some steps will only drill some portion of the total material stack due to existing holes in some layers but often all steps drill the entire stack. Often in a two-step process, the first step results in a hole that is only slightly smaller than the desired final hole size to remove the majority of the material. In general, the resulting hole quality for the first step will be poor because it will be optimized for speed as opposed to quality. The second and final step will produce the desired final hole size and be optimized for hole quality. Because the second step removes a relatively small amount of material, it is easier to optimize to achieve superior hole quality.

Thus, machining a composite/metal stack will usually require a multi-step process, where each step might drill one, several, or all layers of the total material stack. The multi-step process may be performed by two or more drilling units where each of the drilling units performs at least one step of the multi-step process.

An advantage of utilizing multiple drilling units in a multi-step process is that each drilling unit may be configured to optimize its machining operation, e.g., by changing the cutting tool. However, each drilling unit must perform its particular machining operation in the proper sequence relative to each hole being drilled. Accordingly, there is a need for apparatus and methods that will ensure that when using multiple drilling units, each drilling unit will perform its machining operation on each hole drilled in the proper sequence relative to the other drilling units, such that each drilling unit will not be allowed to perform its machining operation out of sequence.

SUMMARY

Apparatus and methods for performing and controlling the sequence of steps in a multi-step machining process and system utilizing multiple drilling units are described. The apparatus may comprise either multiple portable drilling units or multiple automated drilling units, wherein a sensor or sensors are utilized to indicate air flow at a surface of the workpiece being machined in order to determine if the apparatus is performing a particular machining process in its proper sequence of the multi-step machining process.

In an example implementation of a portable apparatus in accordance with the present disclosure, an exhaust duct of a vacuum exhaust system may be connected at the nosepiece attachment of the drilling unit such that when the vacuum exhaust system is connected to an external vacuum source, the vacuum exhaust system may operate to remove debris such as chips and dust from the machining area where the cutting tool machines the workpiece. The vacuum exhaust system may also include at least one absolute pressure sensor positioned to indicate air flow through the vacuum exhaust system by measuring air pressure at its position. If the magnitude of the measured air pressure reads outside of a specified range, a control signal may be sent that may prevent the drilling unit from beginning a predetermined machining process.

Once the external vacuum system is connected to the drilling unit and the operator is ready to begin drilling, the air pressure sensor then measures the air pressure at the surface of the workpiece where the drilling unit is about to begin drilling. The reading at this measuring point is a function of the diameter and shape of the hole or cavity drilled in the workpiece, if any. As an example, a machining process may utilize two drilling units, the first configured to drill a hole with a smaller diameter, and a second configured to drill a hole with a larger diameter than that of the first hole, but only if the first hole has already been drilled. When the first drilling unit is affixed to a drilling jig, and there is no air flow at the workpiece as indicated by a relatively lower absolute pressure (indicating no hole previously drilled in the workpiece) as measured by the air pressure sensor, the first drilling unit may then drill the first hole in the workpiece, and the first drilling unit may then be repositioned on the drilling jig at another guide hole or removed from the drilling jig and affixed to the next drilling jig holding another workpiece to be machined.

After affixing the second drilling unit to the drilling jig, if its air flow at the workpiece as indicated by a relatively higher pressure (indicating a smaller diameter hole previously drilled in the workpiece, then the second drilling unit will proceed to drill a second hole (with a larger diameter) at that guide hole in the drilling jig. However, if the air flow at the workpiece as indicated by a measurement of air pressure by the air pressure sensor of the second drilling unit indicates no hole has been drilled (i.e., a relatively lower pressure reading) or the second hole has already been drilled (i.e., a relatively higher pressure reading), then these readings will cause control signals to be sent that may prevent the drilling unit from beginning a predetermined machining process.

In the first instance, drilling the second hole without the first hole having been drilled may likely cause damage to the workpiece, while in the second instance, drilling the same hole a second time is unnecessary and wasteful. Likewise, as to the first drilling unit, drilling the same hole, in this case, the smaller diameter hole, a second time is also unnecessary and wasteful.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 3A is a top plan view of another portable drilling apparatus where this portable drilling apparatus is shown positioned above the drill jig shown in FIGS. 2A and 2B.

FIG. 3B is a top plan schematic diagram example of the portable drilling apparatus shown in FIG. 3A where the workpiece has an enlarged hole drilled therein.

FIG. 4 is a top plan view of the portable drilling apparatus shown in FIG. 2A where the portable drilling apparatus is shown repositioned above the drill jig shown in FIG. 2A but at a different guide hole.

FIG. 5 is a top plan view of the portable drilling apparatus shown in FIG. 3A where the portable drilling apparatus is shown positioned above the drill jig shown in FIG. 3A but at a different guide hole.

DETAILED DESCRIPTION

Apparatus and methods for performing and controlling the sequence of steps in a multi-step machining process utilizing a plurality of drilling units, where each drilling unit is configured to perform at least one step of the multi-step machining process, are described. The apparatus may be either portable drilling units or automated drilling units.

Figure 1:
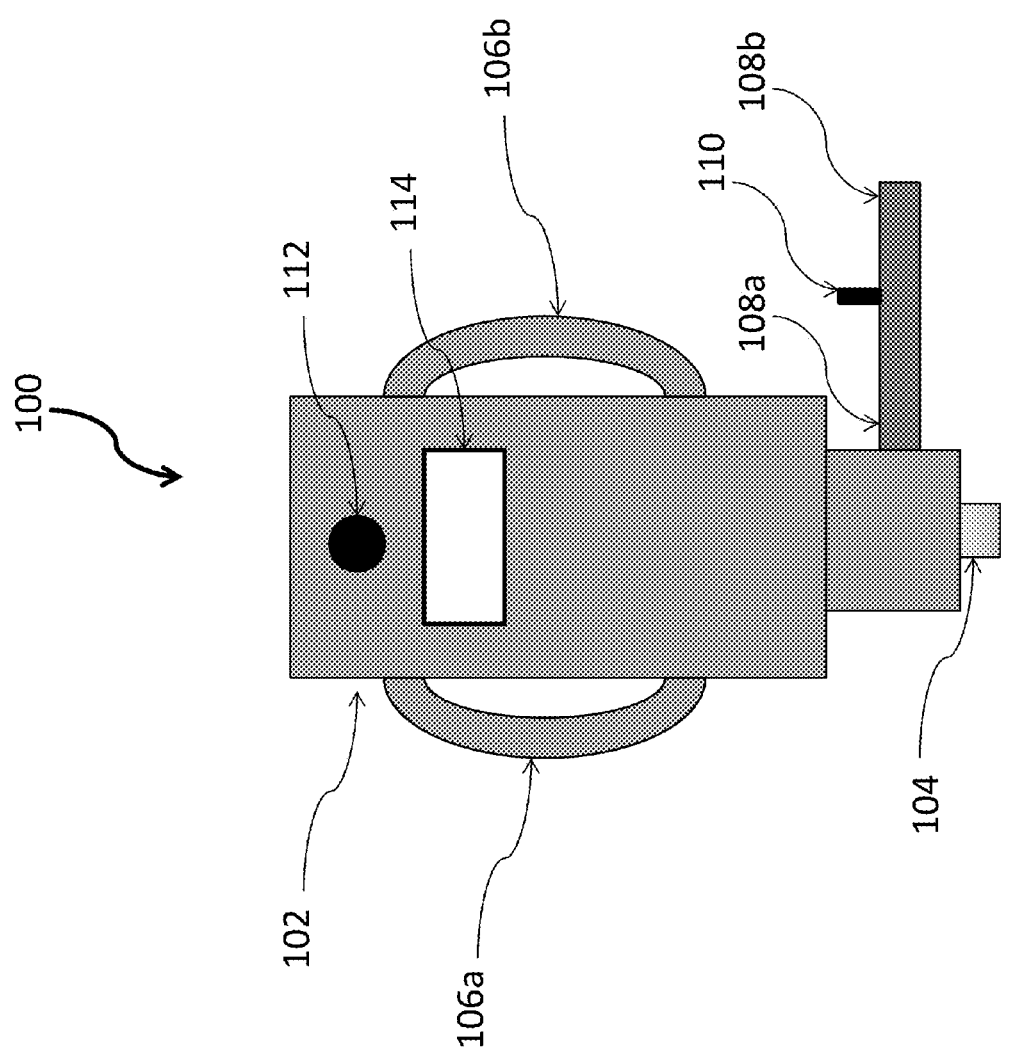
FIG. 1 is a top plan view of an example of a portable drilling apparatus in accordance with the present disclosure.

An example of such a portable drilling apparatus system is shown in FIG. 1, which is a top plan view of an example of a portable drilling apparatus 100 in accordance with the present disclosure. Portable drilling apparatus 100 comprises a portable drilling unit 102 and a nosepiece attachment 104, which is used to rigidly and radially symmetrically fixate the portable drilling unit 102 to a drilling template (not shown) attached to a workpiece (not shown).

The portable drilling apparatus 100 may also include two handles 106a and 106b attached to and supporting the portable drilling apparatus 100, which may be utilized by an operator of the portable drilling apparatus 100 to transport the portable drilling apparatus 100 from workstation to workstation and position the portable drilling apparatus 100 on a drill jig bolted to a workpiece for drilling. The nosepiece attachment 104 may be positioned over the drill jig bushing and is locked onto a guide hole by a mechanism or locking feature.

Vacuum duct 108a-108b is designed to provide a vacuum exhaust system to the drilling unit 102 of the portable drilling apparatus 100, where one end 108a is connected to a cavity within the drilling unit 102 where a cutting tool is engaged with a workpiece, and the other end 108b provides an outlet for connection to an external vacuum system (not shown).

Element 110 is an absolute air pressure sensor located on vacuum duct 108a-108b that is configured to measure the absolute air pressure in the vacuum duct 108a-108b when connected to an external vacuum system (not shown). The absolute air pressure reading can be used as an indicator of the air flow through the vacuum duct 108a-108b. The absolute air pressure sensor 110 is in signal communication with a machine control system of the portable drilling apparatus.

Element 112 is an operator start button that when pressed triggers the start of the drilling cycle. Status indicator 114 shows the operator whether the drilling unit control system will allow the drilling cycle to proceed. If status indicator 114 displays "YES," then the drilling unit control system will allow the drilling cycle to proceed. If status indicator 114 displays "NO," then the drilling unit control system will not allow the drilling cycle to proceed. Status indicator 114 can also signal to the operator that the drilling cycle has been completed by displaying the word "DONE".

Figure 2B:
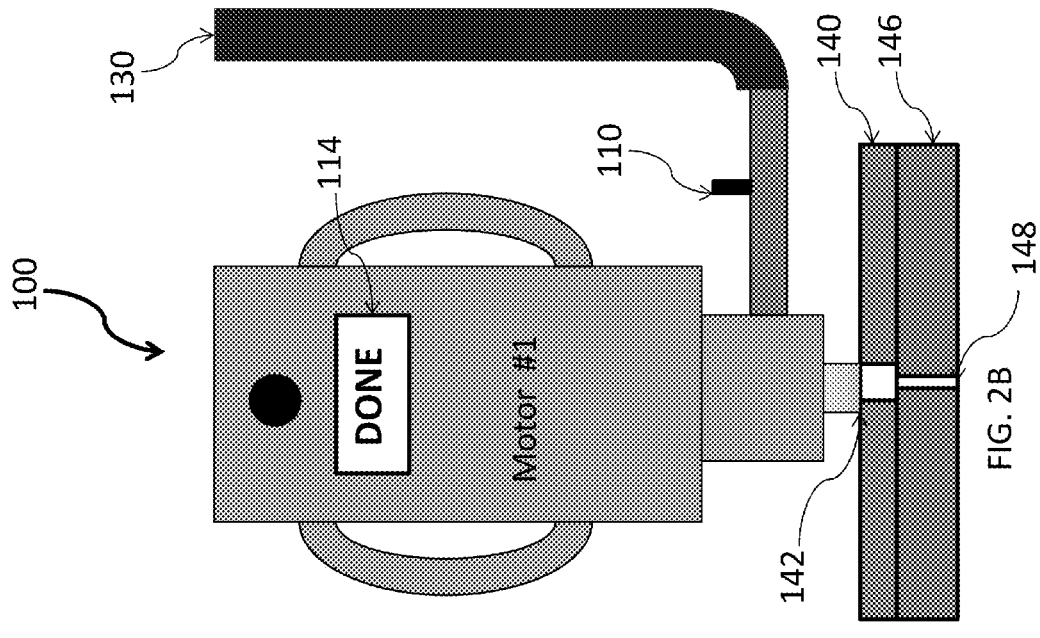
FIG. 2B is a top plan view of the portable drilling apparatus shown in FIG. 3A where the workpiece is shown with an initial hole drilled therein.
Figure 2A:
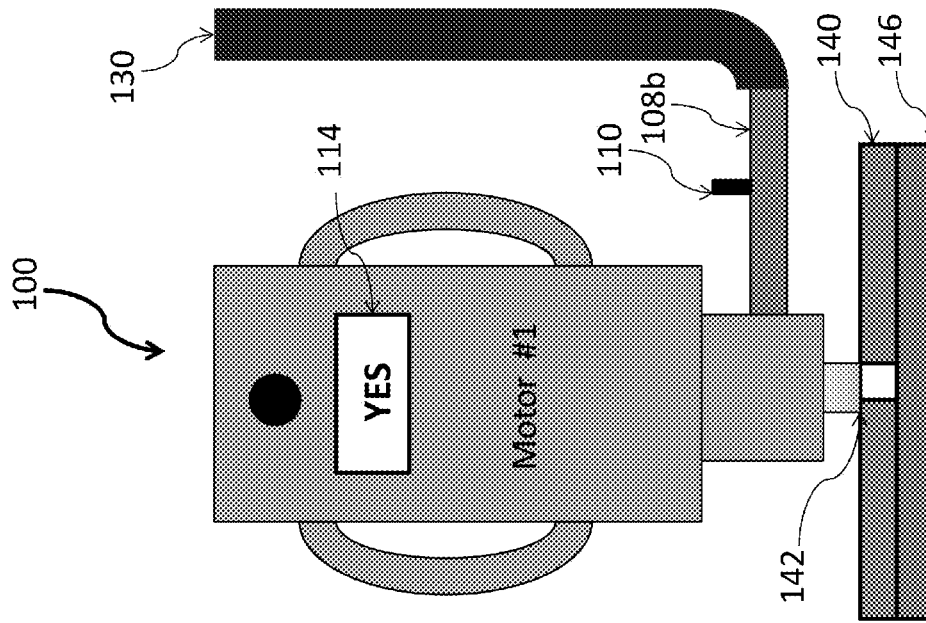
FIG. 2A is a top plan view of the portable drilling apparatus shown in FIG. 1A where the portable drilling apparatus is shown affixed to a drill jig bolted to a workpiece which may be a composite/metal stack material.

FIG. 2A is a top plan view of the portable drilling apparatus shown in FIG. 1A where the portable drilling apparatus 100 is shown affixed to a drill jig 140 bolted to a workpiece 146, which may be a composite/metal stack material. The drill jig 140 may include multiple guide holes (not shown). The portable drilling apparatus 100 is shown with vacuum hose 130 attached at one end 108b of the vacuum duct and connected to an external vacuum source at the other end (not shown).

However, before drilling the hole at the site of hole guide 142, the portable drilling apparatus 100 measures the absolute air pressure at the site of the hole guide 142 using absolute air pressure sensor 110, FIG. 1B. In this instance, portable drilling apparatus 100 is designated to drill a first hole in a multi-step machining process. If a hole has not previously been drilled at the site of the hole guide 142, absolute air pressure sensor 110 will read a relatively low value of approximately 85 kiloPascal (kPa) (where Standard Atmospheric Pressure (atm)=101.3 kPa). Accordingly, if the value read is below a predetermined threshold, e.g., 85.5 kPa, the portable drilling apparatus 100 control system will allow the drilling cycle to proceed. This condition is indicated by the status indicator 114 showing "YES" to the operator.

Turning to FIG. 2B, portable drilling apparatus 100 has completed drilling hole 148 in workpiece 146, and the status indicator 114 now displays a "DONE" indicator. At this point, portable drilling apparatus 100 may be repositioned at another hole guide on drill jig 140, or may be disconnected and moved to a completely different drilling jig, where in either case, the process will be repeated.

FIG. 3A is a top plan view of a second portable drilling apparatus 200, where the portable drilling apparatus 200 is shown affixed to drill jig 140 bolted to a workpiece 146 as shown in FIGS. 2A and 2B. As shown in FIG. 2A, workpiece 146 is shown with first hole 148 having been drilled therein. Again, before having portable drilling apparatus 200 drill a second hole at the site of hole guide 142, the portable drilling apparatus 200 measures the absolute air pressure at the site of the hole guide 142 using absolute air pressure sensor 210. In this instance, portable drilling apparatus 200 is designated to drill a second hole in a multi-step machining process. Accordingly, if a hole has previously been drilled at the site of the hole guide 142, there will be some air flow from the front end of drilling unit 204 and hence absolute air pressure sensor 210 will read a relatively higher absolute air pressure value of approximately 88.0 kPa. Accordingly, if the value reads more than a predetermined threshold, e.g., 87.0 kPa, the portable drilling apparatus 200 will allow the drilling cycle to proceed. This condition is indicated by the status indicator 214 showing "YES" to the operator.

Turning to FIG. 3B, portable drilling apparatus 200 has completed drilling second hole 150 in workpiece 146, and the status indicator 214 now displays a "DONE" indicator. At this point, portable drilling apparatus 200 may be repositioned at another hole guide on drill jig 140, or may be disconnected and moved to a completely different drilling jig, where in either case, the process will be repeated.

Returning to portable drilling apparatus 100, FIG. 4 is a top plan view of the portable drilling apparatus 100 where this portable drilling apparatus is shown repositioned above the drill jig 140 but at a different guide hole 152. In this instance, there is a first hole 154 that has been previously drilled at guide hole 152. Therefore, there will be some air flow from the front end of drilling unit 104 and hence absolute air pressure sensor 110 will read a relatively higher value of approximately 88.0 kPa, indicating that a hole has previously been drilled at guide hole 152. Accordingly, this value reading greater than a predetermined threshold, the portable drilling apparatus 100, which is configured to drill a first hole at guide hole 152, is prevented from drilling the first hole where there is already a hole drilled. This condition is indicated by the status indicator 114 showing "NO" to the operator.

Likewise, FIG. 5 is a top plan view of the portable drilling apparatus 200 where this portable drilling apparatus is also shown repositioned above the drill jig 140 but at a different guide hole 160. In this instance, there is no hole that has been previously drilled at guide hole 160. Therefore, absolute air pressure sensor 210 will read a relatively lower value of approximately 85 kPa because there is no air flow from the front end of drilling unit 204. Because the value read is below a predetermined threshold, the portable drilling apparatus 200 will not be allowed to proceed to drill the second hole of a multi-step machining process. This condition is indicated by the status indicator 214 showing "NO" to the operator.

For purposes of illustration only, the processes described in FIGS. 1-5 refer to two steps to be performed in sequence where the two steps are drilling two holes of varying diameters. It is appreciated by those skilled in the art that the steps of a multi-step machining process may include in addition to the drilling of holes, operations such as burr removal, de-lamination, countersinking, reaming of a drilled hole, etc., as well as eccentric drilling and routing to produce non-standard holes and shapes. Accordingly, the processes and methods of this disclosure are related to performing multi-step machining processes containing two or more steps, where each of these steps may comprise one or more machining steps and these steps may comprise multiple machining operations other than conventional drilling of holes, where the steps are performed with a plurality of drilling units.

Also, the apparatus in FIGS. 1-5 are shown with a single absolute air pressure sensor located in a vacuum duct. It is appreciated by those skilled in the art that other sensors could be used to indicate the air flow at a surface of a workpiece, and that one or more sensors could be located in the vacuum duct or anywhere else on or at the drilling unit where an air flow can be indicated. These include mechanical flow sensors such as a turbine flowmeter, variable area meter, paddle wheel meter, etc., and pressure-based meters such as a Venturi meter, multi-hole pressure probe, cone meters, etc., as well as thermal mass flowmeters and vortex flowmeters, or any other measurement method that may be used to indicate air flow at the workpiece. A vacuum pressure sensor is a pressure sensor that measures pressures below atmospheric pressure, showing the difference between that low pressure and atmospheric pressure (i.e., negative gauge pressure). Accordingly, if a vacuum pressure sensor is used in a drilling apparatus, a higher value would indicate no air flow at the workpiece (i.e., no hole previously drilled in the workpiece), in contrast to a lower value when using an absolute air pressure sensor.

It is also appreciated by those skilled in the art that the circuits, components, modules, and/or devices of, or associated with, the machine control and the vacuum exhaust systems are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection. Likewise, in general, fluid communication refers to any type of communication and/or connection between the circuits, components, modules, and/or devices that allow a circuit, component, module, and/or device to detect pressure variations (increases or decreases) and fluid (including air) flows within drilling apparatus and to pass and/or receive signals and/or information related to these pressure variations between sensors, control systems, and other components.

Figure 6:
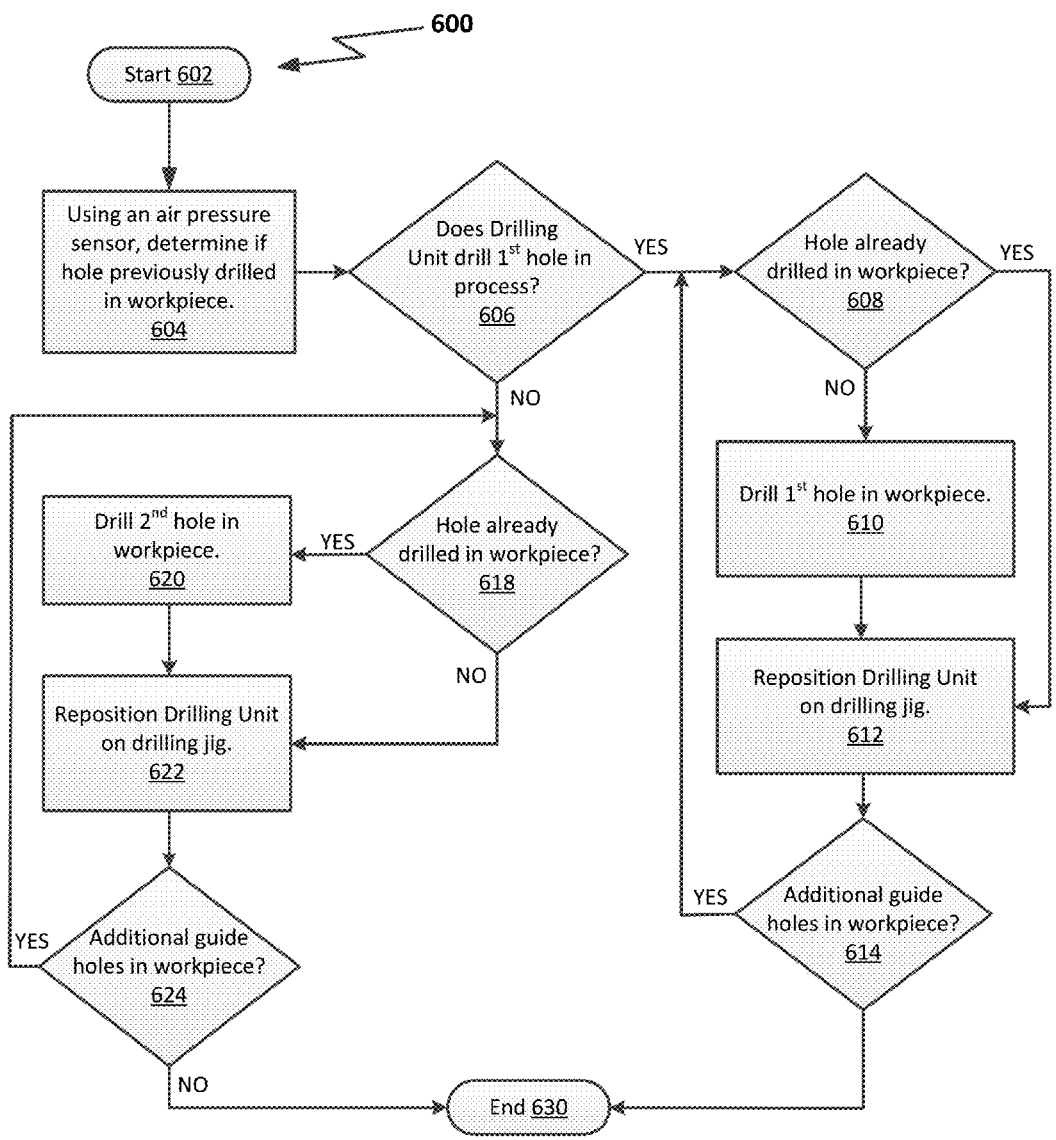
FIG. 6 is a flowchart of an example of a method of machining a composite/metal stack material utilizing a plurality of drilling units in a multi-step machining process, where each of the drilling units performs at least one step of the multi-step machining process.

FIG. 6 is a flowchart of an example of a method of machining a composite/metal stack material utilizing a plurality of drilling units, where each of the drilling units performs at least one step of a multi-step machining process. This method 600 starts in step 602, where a portable drilling apparatus in accordance with the present disclosure is affixed to a drilling jig and clamped onto a hole guide. In step 604, a portable drilling apparatus using an air pressure sensor determines if a hole has been previously drilled in the workpiece in the drilling jig. In decision step 606, a determination is made whether the drilling unit is configured to drill the first hole in a multi-step machining process. If this is the case, in decision step 608 a determination is made, based on the air pressure sensor readings taken in step 604, whether the workpiece has a hole drilled therein. If the answer is NO, the process proceeds to step 610, where the portable drilling apparatus drills a hole in the workpiece. If the answer is YES, the process proceeds to step 612, where the portable drilling apparatus is repositioned on the drilling jig.

If instead of drilling a first hole in a multi-step machining process, the portable drilling apparatus is configured to drill a second hole, the process proceeds to decision step 618, where the same determination is made, based on the air pressure sensor readings taken in step 604, whether the workpiece has a hole drilled therein. In this case, if the answer is YES, the process proceeds to step 620, where the portable drilling apparatus drills a second hole in the workpiece corresponding to the guide hole. If the answer is NO, which indicates that the portable drilling apparatus could possibly drill a second hole where there is no first hole, the process proceeds to step 622, where the portable drilling apparatus is repositioned on the drilling jig.

In both decision step 614 and decision step 624, a determination is made whether there are more holes to be machined in the workpiece. If there are, the process proceeds to steps 608 and 618, respectively. Otherwise, the process ends in step 630.

The process shown in FIG. 6 applies to each portable drilling apparatus configured to machine at least one hole in a multi-step machining process. Each portable drilling apparatus configured to machine at least one hole in the multi-step machining process may operate independently of other portable drilling apparatus and in any sequence, and two or more portable drilling apparatus may be operating on a single drilling jig space permitting.

In these examples, it will be understood and appreciated that one or more of the processes, sub-processes, process steps or approaches described in connection with a machine control system may be performed or controlled by hardware, software, or a combination of hardware and software on one or more electronic or digitally-controlled devices. The software may reside in an application memory in a suitable electronic processing component or system such as, for example, one or more of the functional systems, devices, components, modules, or sub-modules. The application memory may include an ordered listing of executable instructions for implementing logical functions (that is, "logic" that may be implemented in digital form such as digital circuitry or source code or in analog form such as an analog source such as an analog electrical, sound, or video signal). The instructions may be executed within a processing module, which includes, for example, one or more microprocessors, general purpose processors, combinations of processors, digital signal processors ("DSPs"), field programmable gate arrays ("FPGAs"), or application-specific integrated circuits ("ASICs"). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units. It is also understood that term database is used to include traditional databases and relational database, flat files, data structures. Examples of some databases include SQL, MySQL, Microsoft® Access to give but a few examples.

The executable instructions may be implemented as a computer program product having instructions stored there in which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read-only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A method of performing a multi-step machining process utilizing a plurality of drilling units, the method comprising:
    positioning a cutting tool of a portable drilling apparatus adjacent to a surface of a workpiece attached to be machined;
    utilizing an air pressure sensor in a vacuum exhaust system of the portable drilling apparatus to indicate an air flow at the surface of the workpiece by measuring an air pressure at the surface;
    comparing the measured air pressure against a predetermined threshold;
    responsive to the comparison, determining if a hole has been drilled in the workpiece; and
    if it is determined that no hole has been drilled in the workpiece, and the portable drilling apparatus is configured to drill a first hole in the multi-step machining process, drilling the first hole on the workpiece.

2. The method of performing the multi-step machining process of claim 1, further comprising the step of:
if it is determined that a hole has already been drilled in the workpiece, and the portable drilling apparatus is configured to drill a first hole in the multi-step machining process, repositioning the portable drilling apparatus to at least one of another workpiece or another location on the workpiece.

3. The method of performing the multi-step machining process of claim 2, where the workpiece is attached to a drilling jig comprising a plurality of guide holes.

4. The method of performing the multi-step machining process of claim 2, where the vacuum exhaust system comprises:
an exhaust duct comprising an inlet end connected to a drilling unit of the portable drilling apparatus containing the cutting tool, and an outlet end configured for connection to an external vacuum source.

5. The method of performing the multi-step machining process of claim 1, further comprising the step of:
if it is determined that no hole has been drilled in the workpiece, and the portable drilling apparatus is configured to drill a second hole in the multi-step machining process, repositioning the portable drilling apparatus to at least one of another workpiece or another location on the workpiece.

6. The method of performing the multi-step machining process of claim 1, further comprising the step of:
if it is determined that a first hole has already been drilled in the workpiece, and the portable drilling apparatus is configured to drill a second hole in the multi-step machining process, drilling the second hole on the workpiece.

7. The method of performing the multi-step machining process of claim 6, where the step of repositioning the portable drilling apparatus to another workpiece comprises unclamping the portable drilling apparatus from one guide hole on the drilling jig and clamping it to another guide hole on the drilling jig.

8. The method of performing the multi-step machining process of claim 6, further comprising the step of displaying to a user of the portable drilling apparatus a status of the multi-step machining process based on the comparison of the measured air pressure against the predetermined threshold.

9. A portable drilling apparatus configured to perform a step of a multi-step machining process, the portable drilling apparatus comprising:
a vacuum exhaust system; and
an air pressure sensor attached in fluid communication with the vacuum exhaust system and in signal communication with a control system,
wherein the air pressure sensor is configured to indicate an air flow at a surface of a workpiece being machined by the portable drilling apparatus by measuring an air pressure at the surface, and
the control system is configured to compare the measured air pressure to a predetermined threshold to determine if a hole has been drilled in the workpiece where the measured air pressure was taken, and
responsive to the determination, having the portable drilling apparatus proceed or not proceed dependent on a step it is configured to perform and its sequence in the multi-step machining process.

10. The portable drilling apparatus of claim 9, where the air pressure sensor is located on an exhaust duct of the vacuum exhaust system.

11. The portable drilling apparatus of claim 10, further comprising:
a drilling unit having a cutting tool;
a nosepiece attachment configured to provide for rigid and radially symmetrical fixation of the drilling unit onto a drill jig having a drill jig plate; and
a drilling unit control system.

12. The portable drilling apparatus of claim 11, where the drilling unit comprises a cavity wherein the cutting tool of the drilling unit is engaged with the workpiece.

13. The portable drilling apparatus of claim 12, where the vacuum exhaust system further comprises an exhaust duct comprising an inner inlet end connected to the cavity of the drilling unit, and an outer outlet end configured for connection to an external vacuum source.

14. The portable drilling apparatus of claim 13, further comprising a display that indicates to a user of the portable drilling apparatus a status of the multi-step machining process relative to the workpiece being machined by the portable drilling apparatus.

15. A multi-step machining system for machining a composite/metal stack material, the multi-step machining system comprising:
a plurality of drilling units each configured to perform at least one step of a multi-step machining process;
an air pressure sensor located in each drilling unit configured to indicate an air flow at a surface of a workpiece to be machined by the drilling unit by measuring an air pressure at the surface; and
a control system in signal communication with each air pressure sensor configured to:
compare the measured air pressure against a predetermined threshold;
responsive to the comparison, determining if a hole has been drilled in the workpiece where the measured air pressure was taken; and
responsive to the determination, having the drilling unit proceed or not proceed dependent on the step it is configured to perform and its sequence in the multi-step machining process.

16. The multi-step machining system of claim 15, where, if it is determined that a hole has already been drilled in the workpiece, and the drilling unit is configured to drill a first hole in the multi-step machining process, the control system is further configured to not have the drilling unit proceed to drill the workpiece.

17. The multi-step machining system of claim 15, where, if it is determined that a hole has not been drilled in the workpiece, and the drilling unit is configured to drill a first hole in the multi-step machining process, the control system is further configured to have the drilling unit proceed to drill the workpiece.

18. The multi-step machining system of claim 15, where the control system is further configured to display, on each drilling unit, a status indication that shows an operator of the multi-step machining system whether that drilling unit is to proceed or not proceed to perform its step of the multi-step machining process.

19. The multi-step machining system of claim 18, where the control system is further configured to transmit a control signal to a drilling unit that prevents it from drilling a hole when it has been determined that the drilling unit is not to proceed.

* * * * *